(12) United States Patent
Hinterdorfer et al.

(10) Patent No.: US 12,343,732 B2
(45) Date of Patent: Jul. 1, 2025

(54) METHOD FOR CONTROLLING A CRUSHER HAVING A CRUSHING TOOL AND A VIBRATORY CONVEYOR

(71) Applicant: Rubble Master HMH GmbH, Linz (AT)

(72) Inventors: Christian Hinterdorfer, Gutau (AT); Christian Hinterreiter, Obergrünburg (AT)

(73) Assignee: Rubble Master HMH GmbH, Linz (AT)

( * ) Notice: Subject to any disclaimer, the term of this patent is extended or adjusted under 35 U.S.C. 154(b) by 251 days.

(21) Appl. No.: 17/800,010

(22) PCT Filed: May 12, 2021

(86) PCT No.: PCT/AT2021/060169
§ 371 (c)(1),
(2) Date: Aug. 16, 2022

(87) PCT Pub. No.: WO2021/226651
PCT Pub. Date: Nov. 18, 2021

(65) Prior Publication Data
US 2023/0082025 A1    Mar. 16, 2023

(30) Foreign Application Priority Data

May 13, 2020 (AT) .............................. A 50420/2020
May 13, 2020 (AT) .............................. A 50422/2020
May 13, 2020 (AT) .............................. A 50423/2020

(51) Int. Cl.
*B02C 25/00* (2006.01)
*B02C 23/02* (2006.01)
(Continued)

(52) U.S. Cl.
CPC .............. *B02C 25/00* (2013.01); *B02C 23/02* (2013.01); *G05B 13/027* (2013.01); *G06T 7/50* (2017.01);
(Continued)

(58) Field of Classification Search
CPC ...................................................... Y02B 20/40
See application file for complete search history.

(56) References Cited

U.S. PATENT DOCUMENTS 3,480,212 A * 11/1969 Schubert ................. B02C 25/00
241/34
2004/0084557 A1 * 5/2004 Douglas .................... B02C 1/02
241/101.76
(Continued)

FOREIGN PATENT DOCUMENTS

CN    204933653 U  *  1/2016
CN    105478220 A  *  4/2016
(Continued)

OTHER PUBLICATIONS

U.S. Appl. No. 17/795,514, filed Jul. 26, 2022 (U.S. national stage of PCT/AT2021/060140) for Method for Cleaning Blinding Particles in Crushers.
(Continued)

*Primary Examiner* — Suresh Suryawanshi
(74) *Attorney, Agent, or Firm* — Tiajoloff & Kelly LLP

(57) ABSTRACT

A method for controlling a crusher having a crushing tool and a vibratory conveyor (1) having a drive (5), includes capturing bulk material (2) in a capture region (4) using a sensor (3). So that, in the case of grains with an inhomogeneous grain size distribution, even large grains can be crushed with a constant crushing result without a risk of the crusher being damaged, an effective diameter $d_{\it{eff}}$, which results from the largest diameter $d_{max}$ and the direction (9)
(Continued)

thereof, transverse to the conveying direction (8) of a grain of the bulk material (2) is determined as the controlled variable in the capture region (4). If the effective diameter $d_{eff}$ exceeds a predefined power threshold value, the power of the crushing tool is increased and/or, if the effective diameter $d_{eff}$ exceeds a predefined switch-off limit value, the drive (5) is switched off.

13 Claims, 2 Drawing Sheets

(51) Int. Cl.
    *G05B 13/02*     (2006.01)
    *G06T 7/50*     (2017.01)
    *G06T 7/62*     (2017.01)

(52) U.S. Cl.
    CPC ...... *G06T 7/62* (2017.01); *G06T 2207/10028* (2013.01); *G06T 2207/20081* (2013.01); *G06T 2207/20084* (2013.01); *Y02B 20/40* (2013.01)

(56) References Cited

U.S. PATENT DOCUMENTS

| | | | | |
|---|---|---|---|---|
| 2010/0181396 A1* | 7/2010 | Hedin | ...................... | B02C 2/047 |
| | | | | 241/207 |
| 2011/0089270 A1* | 4/2011 | Juha | ........................ | B02C 21/00 |
| | | | | 241/34 |
| 2014/0166791 A1* | 6/2014 | Tjell | ........................ | B02C 25/00 |
| | | | | 241/33 |

FOREIGN PATENT DOCUMENTS

| | | | | | |
|---|---|---|---|---|---|
| CN | 108711149 A | * | 10/2018 | ............. | G06T 5/002 |
| CN | 208928360 U | | 6/2019 | | |
| CN | 110852395 A | * | 2/2020 | ......... | G01N 15/0205 |
| DE | 281668 A5 | | 8/1990 | | |
| DE | 4326530 A1 | | 10/1994 | | |
| DE | 19741524 A1 | | 3/1999 | | |
| DE | 10046464 A1 | | 4/2002 | | |
| EP | 1188695 A1 | | 3/2002 | | |
| JP | 2017205737 A | | 11/2017 | | |
| WO | 2017093608 A1 | | 6/2017 | | |

OTHER PUBLICATIONS

U.S. Appl. No. 17/799,998, filed Aug. 16, 2022 (U.S. national stage of PCT/AT2021/060163) for Method for Detecting Wear in Crushers During Idle Operation.
U.S. Appl. No. 17/800,010, filed Aug. 16, 2022 (U.S. national stage of PCT/AT2021/060169) for Method for Controlling a Crusher, (this application).
U.S. Appl. No. 17/800,031, filed Aug. 16, 2022 (U.S. national stage of PCT/AT2021/060162) for Method for Determining, in Parts, The Volume of a Bulk Material Fed Onto a Conveyor Belt.
U.S. Appl. No. 17/800,041, filed Aug. 16, 2022 (U.S. national stage of PCT/AT2021/060165) for Method of Dust Suppression for Crusherswith Spraying Devices.
U.S. Appl. No. 17/785,800, filed Jun. 15, 2022 (U.S. national stage of PCT/AT2021/060141) for Method for Determining the Bulk Density of Bulk Material in a Mobile Crusher.
U.S. Appl. No. 17/789,877, filed Jun. 29, 2022 (U.S. national stage of PCT/AT2021/060164) for Method for Determining the Particle Size Distribution of Parts of a Bulk Material Fed Onto a Conveyor Belt.
U.S. Appl. No. 17/784,351, filed Jun. 10, 2022 (U.S. national stage of PCT/AT2021/060011) for Device for a Crusher.
Espacenet Abstract for CN208928360 U, Jun. 4, 2019.
Espacenet Abstract for DE19741524 A1, Mar. 25, 1999.
Espacenet Abstract for EP1188695 (A1), Mar. 20, 2002.
Espacenet Abstract for JP2017205737 A, Nov. 24, 2017.

\* cited by examiner

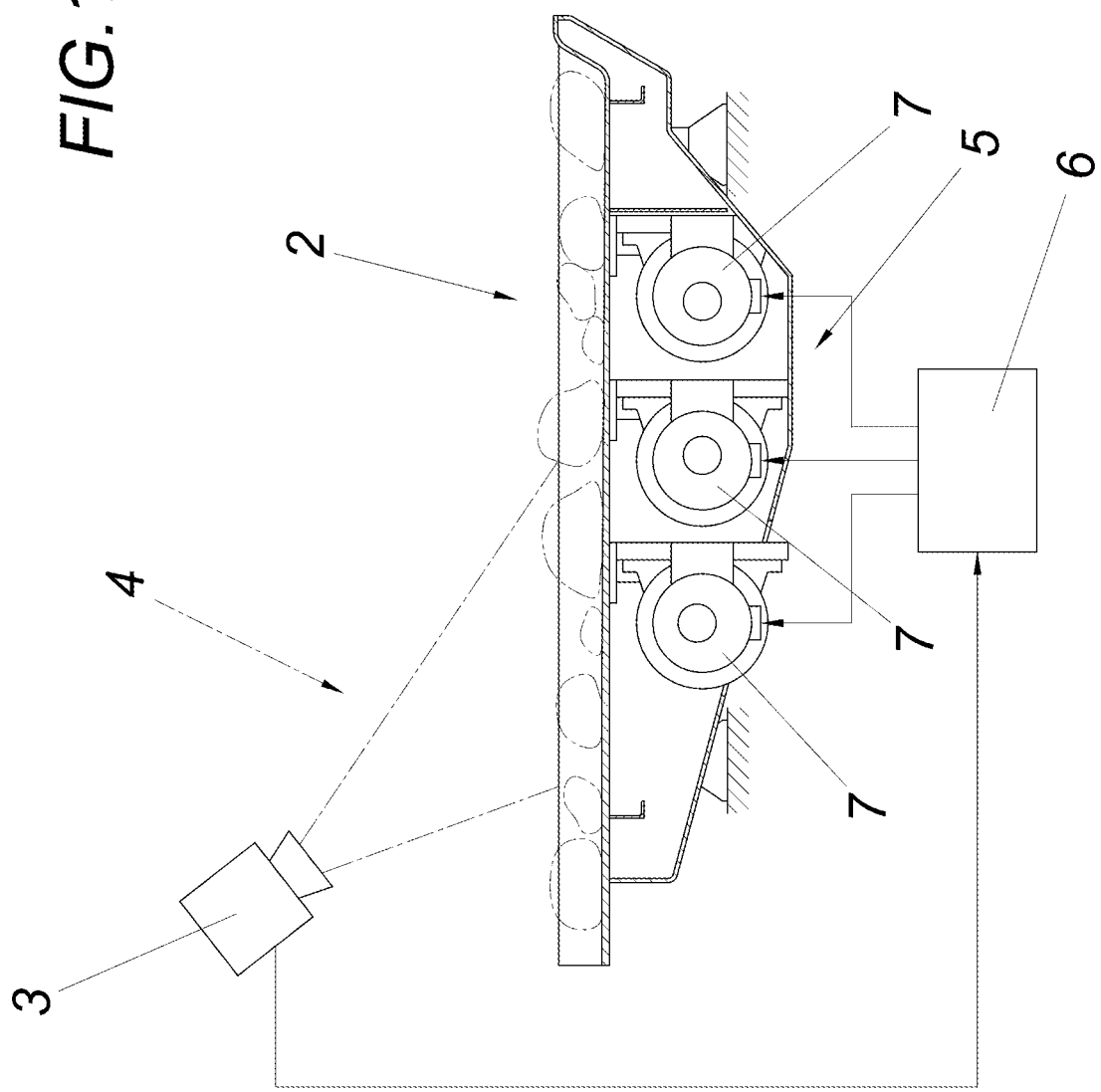

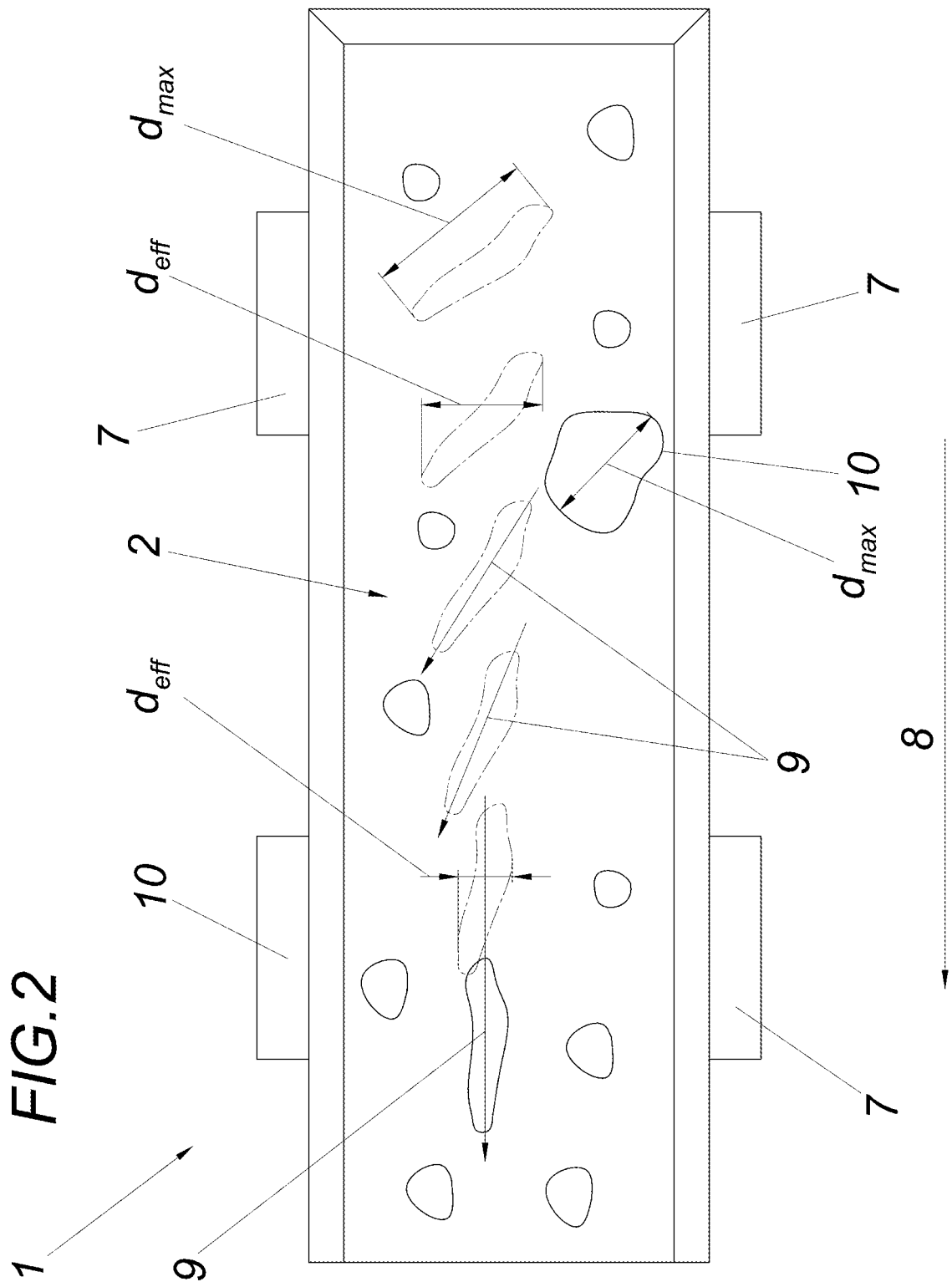

METHOD FOR CONTROLLING A CRUSHER HAVING A CRUSHING TOOL AND A VIBRATORY CONVEYOR

FIELD OF THE INVENTION

The invention relates to methods for controlling a crusher having a crushing tool and a vibratory conveyor having a drive, wherein bulk material disposed in a capturing region is captured using a sensor.

DESCRIPTION OF THE PRIOR ART

It is known from the prior art to use vibratory conveyors for feeding crushers. For this purpose, bulk material is fed in batches onto the vibratory conveyor, for example by an excavator. In order to feed the crusher as uniformly as possible with the bulk material fed in batches, it is known from DE19741524A1 to control the drive as a function of the vibration amplitude of the vibratory conveyor. For this purpose, an optical sensor is used to detect the vibration amplitude at predetermined intervals. The deviation between the vibration amplitude at a predetermined interval and a predetermined set value is detected, whereupon the drive of the vibratory conveyor is controlled to minimize the deviation. Bulk material to be crushed in particular has an extremely inhomogeneous particle size distribution, so that when feeding a crusher with the aid of the control system known from the prior art, an overload or blockage of the crusher can occur if there is a large number of particularly large bulk material particles in the batch.

SUMMARY OF THE INVENTION

The invention is thus based on the object of improving a method of the type described at the beginning to the effect that, in the case of grains with inhomogeneous grain size distribution, even large grains can be crushed with a constant crushing result without any risk of damage to the crusher.

The invention solves the set task by determining as a controlled variable an effective diameter $d_{eff}$ resulting from the largest diameter $d_{max}$ and the direction thereof transverse to the conveying direction of a grain of the bulk material in the capturing region, and by increasing the power of the crushing tool when the effective diameter $d_{eff}$ exceeds a predetermined power threshold value and/or by switching off the drive when the effective diameter $d_{eff}$ exceeds a predetermined shutdown threshold value. As a result of the measures according to the invention, a categorization is carried out for the grains conveyed through the capturing region, in which the effective diameter $d_{eff}$ of the crushers is compared with comparative values. The power threshold value can be provided as a comparison value, the power of the crushing tool being increased when the effective diameter $d_{eff}$ of a grain is exceeded. The associated increase in impact energy can prevent motor depression, i.e. an undesirable reduction in the speed of the crusher rotor, so that even large grains whose effective diameter $d_{eff}$ is close to the dimensions of the crusher inlet can be crushed. The power threshold value can be a fixed grain diameter that is below a shutdown threshold value. In order to prevent damage to the crusher, such a shutdown threshold value can form a reference value, above which the conveying of the bulk material, even before it reaches the crusher, is interrupted. In a particularly safe embodiment of the method, the crusher itself can also be shut down. In principle, various image processing methods known from the prior art can be used to determine the effective diameter $d_{eff}$. For this purpose, the grains in the capturing region of a sensor can be detected and subjected to a particle segmentation, for example a watershed transformation. For this purpose, the sensor can comprise, for example, an optical or a depth sensor that records the grains in the capturing region and images them in a two-dimensional image. By applying a bounding box method, the largest diameter $d_{max}$ and the effective diameter $d_{eff}$ transverse to the conveying direction resulting from its direction can subsequently be inferred. This means that the effective diameter $d_{eff}$ is obtained by projecting the largest diameter $d_{max}$ onto a straight line extending transverse to the conveying direction. Although 2D image processing methods can be used, 3D image processing methods using a volume sensor as a sensor provide better results with regard to diameter determination, as this also allows the depth information of the detected grains to be determined.

While the increase in power of the crusher, as well as the selective switching off of the vibratory conveyor, lead to an increase in efficiency of the crushing process, especially for bulk material with large grains, these measures are not effective for small grains, which may not be crushed by the crusher at all. Therefore, in order to also achieve a uniform and efficient feeding of the crusher for bulk material with a strongly varying grain size distribution, it is proposed that the drive is controlled in such a way that the volume of the bulk material lying in a capturing region, which is detected at predetermined intervals by a volume sensor, corresponds to a preset value as a controlled variable. As a result of this measure, it is not the vibration amplitude of the vibratory conveyor that is kept constant, but the volume flow itself, which enables uniform feeding of the crusher regardless of the particle size distribution of the bulk material. For this purpose, the volume of the bulk material arranged in a capturing region of a volume sensor is determined at regular intervals as a controlled variable and compared with a preset value, for example a nominal volume input flow of the crusher. If the volume per interval detected by the volume sensor is below the preset value, the drive can be controlled to increase the vibration amplitude and/or to increase the vibration frequency until the preset value is reached. If the preset value is exceeded, the drive can be controlled to decrease the vibration amplitude and/or the vibration frequency until it falls below the preset value. In a preferred embodiment, control can also be performed so that the captured volume is within a predetermined range as the preset value. A stereo camera can be provided as the volume sensor, which can determine the volume using common image processing methods. Unbalance motors are usually provided as the drive for the vibratory conveyor.

When conveying particularly coarse bulk material, grains may regularly occur whose largest diameter exceeds the crusher inlet of the crusher. In order to prevent blocking of the crusher without having to stop the conveying or crushing process, it is proposed that an effective diameter $d_{eff}$ transverse to the conveying direction of a grain of the bulk material is determined and at least two actuators of the drive are controlled in such a way that the effective diameter $d_{eff}$ transverse to the conveying direction is reduced. To displace the bulk material grain, the actuators, for example unbalance motors, other vibration exciters or dampers can be controlled independently of each other to influence their vibration amplitude and vibration frequency, so that an alignment of the bulk material grain, hereinafter also referred to as grain, is made possible by an asymmetrical vibration input. The reduction of the effective diameter $d_{eff}$, which results for example from the largest diameter $d_{max}$ and its direction, can be achieved by aligning the largest diameter $d_{max}$ in the conveying direction. The direction of the largest diameter does not have to coincide exactly with the conveying direction, but can lie within a tolerance angle, for example. However, the effective diameter $d_{eff}$ can also correspond to the extension of an envelope around the respective grain transverse to the conveying direction. Alignment can be achieved by increasing the drive power if the cross-section of the conveying chute of the vibratory conveyor is such that the bulk material grains are aligned in an energetic minimum with their largest diameter in the conveying direction. This is the case, for example, if the conveying chute is V-shaped in cross-section. If there are several grains at the vibratory conveyor whose effective diameter exceeds the crusher inlet of the crusher, the actuators can be controlled to align the grain closest to the crusher inlet. It is probably not necessary to mention further that the crusher inlet of the crusher must be aligned in such a way that the crusher inlet longitudinal axis is arranged parallel to the conveying direction, so that an alignment of the bulk grain according to the invention allows it to pass the crusher inlet.

In order to be able to carry out the alignment of the bulk material grains in a particularly energy-efficient manner, if the effective diameter $d_{eff}$ transverse to the conveying direction of a grain in the capturing region exceeds a predetermined alignment threshold value, the at least two actuators of the drive can be controlled to reduce the effective diameter $d_{eff}$ of the grains. This means that the alignment is only applied to bulk material grains that can actually lead to a blockage of the crusher inlet. This can be determined by comparing an effective diameter of the bulk material grain with an alignment threshold value, so that the alignment only takes place when this alignment threshold value is exceeded.

The sensor can be a volume sensor which transmits an image of the bulk material arranged in its capturing region to an evaluation unit, for example a screen. In the image, the bulk material grains exceeding the alignment threshold value, the shut-off threshold value and the power threshold value can be marked.

With common sensors and 2D image processing methods known from the prior art, the problem of inaccurate detection of the volume and geometry of the bulk material can occur, especially with large vibration amplitudes and conveying speeds of the bulk material. Therefore, in order to be able to achieve a valid determination of the volume, the largest diameter $d_{max}$, the effective diameter $d_{eff}$ transverse to the conveying direction of the bulk material, as well as the exceeding of the effective diameter $d_{eff}$ above a predetermined threshold value, despite the difficult optical measuring conditions typical for a vibratory conveyor, it is proposed that the sensor comprises a depth sensor, which generates a two-dimensional depth image of bulk material conveyed past the depth sensor and is fed to a pre-trained convolutional neural network, which has at least three convolution layers located one behind the other and a downstream classifier, for example a so-called fully connected layer. One or more classifiers may be provided depending on the parameter to be determined for the grains in the capturing region. For example, a volume classifier can be provided for determining the bulk volume, the output value of which is output as the bulk volume present in the capturing region of the sensor. Further, a first diameter classifier may be provided for determining the largest diameter $d_{max}$, the output value of which is output as the largest diameter $d_{max}$ of a grain present in the capturing region of the sensor. Furthermore, a second diameter classifier may be provided for determining the effective diameter $d_{eff}$, the output value of which is output as the largest effective diameter $d_{eff}$ of a grain lying within the capturing region of the sensor. Finally, a power classifier or a shutdown classifier may be provided whose output value indicates the exceeding of the largest effective diameter $d_{eff}$ above a predetermined power threshold value or a predetermined shutdown threshold value. As a result of these measures, the parameters of the bulk material can be determined even under varying light conditions and conveying conditions. This is based on the consideration that when two-dimensional depth images are used, the information required for parameter determination can be extracted from the depth information after a neural network used for this purpose has been trained with training depth images with known bulk material parameters. In this context, the convolution layers reduce the input depth images to a set of individual features, which in turn are evaluated by the downstream classifier, so that the desired parameter of the bulk material mapped in the input depth image can be determined as a result. The number of convolution layers provided, each of which may be followed by a pooling layer for information reduction, may be at least three, preferably five, depending on the available computing power. Between the convolution layers and the downstream classifiers, a dimension reduction layer, a so-called flattening layer, can be provided in a known manner. The desired parameter therefore no longer has to be calculated for each individual grain. Since in the depth image the distance of the imaged bulk material to the depth sensor is mapped with only one value per pixel, the amount of data to be processed can be reduced in contrast to the processing of color images, the measuring procedure can be accelerated and the memory requirement necessary for the neural network can be reduced. As a result, the neural network can be implemented on inexpensive AI parallel computing units with GPU support and the method can be used regardless of the color of the bulk material. Also, the desired bulk material parameter can be determined by accelerating the measurement method even at conveying speeds of 3 m/s, preferably 4 m/s. The mentioned reduction of the amount of data in the depth image and thus in the neural network additionally lowers the error rate for the correct determination of the bulk material parameter. In contrast to color or grayscale images, the use of depth images has the additional advantage that the measurement procedure is largely independent of changing exposure conditions. For example, a vgg16 network (Simonyan/Zisserman, Very Deep Convolutional Networks for Large-Scale Image Recognition, 2015), which is usually only used for color images, can be used as a neural network, which is reduced to only one channel, namely for the values of the depth image points. For example, the depth image can be acquired with a 3D camera, since it can be placed above a vibratory conveyor even when space is limited, due to its smaller footprint. Furthermore, to compensate for fluctuations in the detection of the desired parameter and to compensate for erroneous output values of the neural network, several successive output values of the classifier can be averaged and the average value can be output as the desired parameter of the bulk material in the capturing region. In particular, a described neural network can be used to control a crusher having a crushing tool and a vibratory conveyor having a drive, wherein bulk material lying in a capturing region is detected by a depth sensor, which generates a two-dimensional depth image of bulk material conveyed past the depth sensor and is fed to a previously trained convolutional neural network which has at least three convolution layers arranged one behind the other and a downstream classifier whose output value is output as a parameter of the bulk material present in the capturing region. The classifier can be a power classifier and/or a shutdown classifier, wherein the power classifier indicates as a positive output value the exceeding of the largest effective diameter $d_{eff}$ above a predetermined power threshold value and the shutdown classifier indicates as a positive output value the exceeding of the largest effective diameter $d_{eff}$ above a predetermined shutdown threshold value and, in the case of a positive output value of the power classifier, the power of the crushing tool is increased and/or, in the case of a positive output value of the shutdown classifier, the drive of the vibrating conveyor is switched off.

Training the neural network becomes more difficult and the measuring accuracy decreases during operation if elements foreign to the bulk material lie within the capturing region of the depth sensor. These include, for example, vibrating components of the vibratory conveyor itself, or other machine elements. To avoid the resulting disturbances, it is suggested that the values of those pixels are removed from the depth image whose depth corresponds to a previously detected distance between the depth sensor and a background for this pixel or exceeds this distance. In this way, disturbing image information, caused for example by vibrations of the unbalance motors, can be removed and both the depth images and the training depth images can be limited to the information relevant for the measurement.

The training of the neural network requires large quantities of training depth images that represent the bulk material to be detected as accurately as possible. However, the amount of work required to measure the necessary amount of bulk material is extremely high. In order to provide the neural network with sufficient training depth images to determine the desired parameter(s), it is proposed that sample depth images of a sample grain with a known individual parameter are acquired and stored together with the individual parameter, whereupon a plurality of example depth images are randomly combined to form a training depth image, to which, as a common parameter, for example the sum, the maximum value or the mean value of the individual parameters of the composite example depth images is assigned, whereupon the training depth image is fed to the neural network on the input side and the assigned common parameter is fed to the neural network on the output side and the weights of the individual network nodes are adapted in a learning step. The training method is thus based on the idea that by combining example depth images of measured example grains, manifold combinations of training depth images can be created. Thus, it is sufficient to acquire example depth images of relatively few example grains with their individual parameters to generate a large number of training depth images with which the neural network can be trained. To train the neural network, the weights between the individual network nodes are adjusted in a known manner in the individual training steps so that the actual output value corresponds as closely as possible to the specified output value at the end of the neural network. Different activation functions can be specified at the network nodes, which are decisive for whether a sum value present at the network node is passed on to the next level of the neural network. For depth image processing, it is also proposed here that the values of those pixels are removed from the depth image whose depth corresponds to a previously detected distance between the depth sensor and the background, for example the conveying chute of the vibratory conveyor, for this pixel or exceeds this distance. As a result, the training depth images and the depth images of the measured bulk material have only the information relevant for the measurement, which results in a more stable training behavior and increases the detection rate in the application. By selecting the example depth images or the training depth images composed of them, the neural network can be trained on any type of bulk material.

To further improve the training behavior and recognition rate, it is proposed that the sample depth images with random alignment are combined to form a training depth image. Thus, for a given number of grains per example depth image, the number of possible arrangements of the grains is significantly increased without the need to generate more example depth images and overfitting of the neural network is avoided.

Separation of the grains of the bulk material can be omitted and larger bulk material volumes can be determined at a constant conveyor speed of the conveyor belt if the example depth images are combined with partial overlaps to form a training depth image, wherein the depth value of the training depth image in the overlap area corresponds to the smallest depth of both example depth images. In order to capture realistic bulk distributions, the cases where two grains come to rest on top of each other must be considered. The neural network can be trained to detect such overlaps and still determine the parameters of the example grains.

BRIEF DESCRIPTION OF THE INVENTION

In the drawing, the subject matter of the invention is shown by way of example, wherein:

FIG. 1 shows a schematic side view of a vibratory conveyor for carrying out the method according to the invention, and FIG. 2 shows a top view of such a vibratory conveyor on a larger scale.

DETAILED DESCRIPTION OF THE PREFERRED EMBODIMENTS

A method according to the invention can be used for the control of a vibratory conveyor 1 shown in FIG. 1. Vibratory conveyors 1 are used, for example, for feeding crushers with bulk material 2. In order to enable effective crushing even in the case of inhomogeneous bulk material 2, i.e. bulk material 2 with strongly varying grain size distribution, and at the same time to increase the service life of the crusher, an effective diameter $d_{eff}$ transverse to the conveying direction 8 of a grain of the bulk material 2 resulting from the largest diameter $d_{max}$ and its direction 9 is used as a controlled variable (FIG. 2). If the effective diameter $d_{eff}$ exceeds a predetermined power threshold value, the power of a crushing tool of a crusher not shown is increased. When the effective diameter $d_{eff}$ exceeds a predetermined shutdown threshold, the drive 5 of the vibratory conveyor 1 is switched off. To determine the effective diameter $d_{eff}$ or the largest diameter $d_{max}$ of the bulk material 2, a sensor 3 is provided which picks up the bulk material 2 lying in its capturing region 4 and transfers the recorded data to a control unit 6. The control unit 6 can determine the diameters by means of common image processing methods or with the aid of a pre-trained neural network and control the drive 5, as well as a drive of the crusher (not shown), depending on the specified limit or threshold values.

In addition, the drive 5 can be controlled in such a way that the volume of the bulk material 2 lying in the capturing region 4, which is detected by the sensor 3 at predetermined intervals, corresponds to a preset value as a controlled variable. In this context, the drive 5 is controlled by adjusting the vibration amplitude and/or the vibration frequency in such a way that the controlled variable corresponds to a preset value. Such a preset value can, for example, be a range of a nominal volume input flow to which a crusher to be fed is designed.

As can be seen from FIG. 2, the grains of the bulk material 2 can be aligned by selective control of the drive 5. For this purpose, the drive 5 can comprise several unbalance motors 7 as drives, which can be controlled independently of each other via actuators with regard to their vibration amplitude and vibration frequency. In this way, an asymmetrical vibration input can be generated, whereby, for example, particularly long bulk material grains can be aligned in such a way that their largest diameter $d_{max}$ is displaced in the conveying direction 8 and thus their effective diameter $d_{eff}$ resulting from the largest diameter $d_{max}$ and its direction 9 is reduced. This can prevent blocking of the crusher by particularly long bulk material 2.

To ensure that only bulk material 2 which can actually cause a blockage of the crusher is displaced, the effective diameter $d_{eff}$ resulting from the largest diameter $d_{max}$ and direction 9 thereof can be compared with an alignment threshold value. Only if the alignment threshold value is exceeded is a displacement of the bulk material 2 initiated by a corresponding control of the actuators of the unbalance motors 7.

FIG. 2 also shows a bulk material grain 9 which, due to its formation, would lead to a blocking of the crusher even after an appropriate alignment of the largest diameter $d_{max}$. In order to prevent damage to the crusher caused by a particularly coarse bulk material grain 10, it is proposed that the control device 6 switches off the drive 5 when the effective diameter $d_{eff}$ resulting from the largest diameter $d_{max}$ and its direction 9 is exceeded via a shutdown threshold value.

If the effective diameter $d_{eff}$ is just below the shutdown threshold value, an increase in the crushing tool power can be sufficient. For this purpose, the crushing tool can be controlled by the control device 6 if the effective diameter $d_{eff}$ exceeds a power threshold value.

The invention claimed is:

1. A method for controlling a crusher having a crushing tool and a vibratory conveyor having a drive, said method comprising:
   capturing bulk material in a capturing region using a sensor;
   determining a largest diameter $d_{max}$ and a direction thereof of a grain of the bulk material;
   determining an effective diameter $d_{eff}$ from the largest diameter $d_{max}$ and the direction thereof that is transverse to a conveying direction of the grain of the bulk material as a controlled variable in the capturing region; and
   increasing power of the crushing tool when the effective diameter $d_{eff}$ exceeds a predetermined power threshold value or switching off the drive when the effective diameter $d_{eff}$ exceeds a predetermined shutdown threshold value.

2. The method according to claim 1, wherein at least two actuators of the drive are controlled so that the effective diameter $d_{eff}$ is reduced transversely to the conveying direction.

3. The method according to claim 1, wherein, when the effective diameter $d_{eff}$ transverse to the conveying direction of a grain in the capturing region exceeds a predetermined alignment threshold value, at least two actuators of the drive are controlled so as to reduce the effective diameter $d_{eff}$ of the grains.

4. The method according to claim 1, wherein the drive is controlled so that a volume, captured at predetermined intervals by a volume sensor, of the bulk material lying in the capturing region corresponds as a controlled variable to a preset value.

5. The method according to claim 4, wherein the sensor comprises a depth sensor that generates a two-dimensional depth image of the bulk material conveyed past the depth sensor, and the two-dimensional depth image is fed to a previously trained convolutional neural network that has at least three successive convolution layers and a downstream classifier, wherein an output value of the neural network is output as a parameter of the bulk material present in the capturing region.

6. A training method for training the neural network for a method according to claim 5, said training method comprising
   first acquiring example depth images each of a respective example grain with a known individual parameter and storing said example depth images together with the individual parameters thereof;
   combining a plurality of said example depth images randomly so as to form a training depth image to which a sum of the individual parameters, a maximum value of the individual parameters, or a mean value of the individual parameters of the combined example depth images is assigned as a common parameter; and
   feeding the training depth image to the neural network on an input side thereof, and feeding the common parameter assigned to said training depth image to the neural network on an output side thereof; and
   adapting weights of the individual network nodes in a learning step.

7. The method according to claim 2, wherein, when the effective diameter $d_{eff}$ transverse to the conveying direction of a grain in the capturing region exceeds a predetermined alignment threshold value, the at least two actuators of the drive are controlled so as to reduce the effective diameter $d_{eff}$ of the grains.

8. The method according to claim 2, wherein the drive is controlled so that a volume, captured at predetermined intervals by a volume sensor, of the bulk material lying in the capturing region corresponds as a controlled variable to a preset value.

9. The method according to claim 3, wherein the drive is controlled so that a volume, captured at predetermined intervals by a volume sensor, of the bulk material lying in the capturing region corresponds as a controlled variable to a preset value.

10. The method according to claim 7, wherein the drive is controlled so that a volume, captured at predetermined intervals by a volume sensor, of the bulk material lying in the capturing region corresponds as a controlled variable to a preset value.

11. The method according to claim 8, wherein the sensor comprises a depth sensor that generates a two-dimensional depth image of the bulk material conveyed past the depth sensor, and the two-dimensional depth image is fed to a previously trained convolutional neural network that has at least three successive convolution layers and a downstream classifier, wherein an output value of the neural network is output as a parameter of the bulk material present in the capturing region.

12. The method according to claim 9, wherein the sensor comprises a depth sensor that generates a two-dimensional depth image of the bulk material conveyed past the depth sensor, and the two-dimensional depth image is fed to a previously trained convolutional neural network that has at least three successive convolution layers and a downstream classifier, wherein an output value of the neural network is output as a parameter of the bulk material present in the capturing region.

13. The method according to claim 10, wherein the sensor comprises a depth sensor that generates a two-dimensional depth image of the bulk material conveyed past the depth sensor, and the two-dimensional depth image is fed to a previously trained convolutional neural network that has at least three successive convolution layers and a downstream classifier, wherein an output value of the neural network is output as a parameter of the bulk material present in the capturing region.

\* \* \* \* \*